(12) United States Patent  
Chernoff

(10) Patent No.: US 7,097,229 B1
(45) Date of Patent: Aug. 29, 2006

(54) VEHICLE CLOSURE SYSTEM

(75) Inventor: Adrian B. Chernoff, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/127,477

(22) Filed: May 12, 2005

(51) Int. Cl.
*B60J 5/06* (2006.01)
*E05F 17/00* (2006.01)

(52) U.S. Cl. .............. 296/146.1; 296/146.11; 296/146.12; 296/202; 49/95; 49/143; 49/163

(58) Field of Classification Search ........... 296/146.1, 296/146.12, 146.13, 155, 202, 146.11; 49/95, 49/98, 104, 109–114, 142, 143, 163, 168
See application file for complete search history.

(56) References Cited

U.S. PATENT DOCUMENTS

| | | | | |
|---|---|---|---|---|
| 5,242,208 A | * | 9/1993 | Ohya | 296/146.1 |
| 5,491,875 A | | 2/1996 | Siladke et al. | |
| 6,036,257 A | | 3/2000 | Manuel | |
| 6,183,039 B1 | * | 2/2001 | Kohut et al. | 296/155 |
| 6,234,565 B1 | * | 5/2001 | Bryant et al. | 296/155 |
| 6,447,054 B1 | * | 9/2002 | Pietryga et al. | 296/202 |
| 6,550,845 B1 | * | 4/2003 | Pietryga | 296/146.1 |
| 6,609,748 B1 | * | 8/2003 | Azzouz et al. | 296/146.1 |
| 6,616,214 B1 | * | 9/2003 | Wattebled | 296/146.1 |
| 6,682,130 B1 | * | 1/2004 | Lustig et al. | 296/190.11 |
| 6,851,743 B1 | * | 2/2005 | George et al. | 296/202 |

\* cited by examiner

*Primary Examiner*—D. Glenn Dayoan
*Assistant Examiner*—Greg Blankenship
(74) *Attorney, Agent, or Firm*—Kathryn A. Marra

(57) ABSTRACT

A vehicle includes a body and a door closure system. The closure system includes a first door pivotably connected with respect to the vehicle body for selective movement between open and closed positions. A second door is movably connected with respect to the vehicle body. In a first configuration, the first door is in the closed position such that the first door obstructs a first portion of a body opening and the second door is in a first position such that the second door obstructs a second portion of the body opening. In a second configuration, the first door is in the closed position and the second door is in a second position such that at least a portion of the second door inner surface opposes the first door outer surface.

10 Claims, 2 Drawing Sheets

US 7,097,229 B1

VEHICLE CLOSURE SYSTEM

TECHNICAL FIELD

This invention relates to vehicle body closure systems having a first door being pivotably mounted with respect to a vehicle body, and a second door being selectively movable to a position in which the second door is outboard of the first door.

BACKGROUND OF THE INVENTION

Vehicle bodies define body openings for providing access to a passenger compartment. Vehicle doors are typically mounted to the vehicle body via hinges and are pivotable between open and closed positions to selectively obstruct the body openings. Some prior art vehicles include only one door per vehicle side, i.e., "two-door" vehicles. Other prior art vehicles include two doors per vehicle side, i.e., a front door and a rear door.

A front door is typically mounted via hinges to a front hinge pillar such that the front door pivots about a vertical axis adjacent the forward end of the door. A rear door is typically mounted via hinges to a center pillar such that the rear door pivots about a vertical axis adjacent the forward end of the door. Some rear doors are pivotable about axes that are adjacent the rearward end of the door, such as the door described in U.S. Pat. No. 5,491,875, issued Feb. 20, 1996 to Siladke et al, assigned to the assignee of the present application, and which is hereby incorporated by reference in its entirety.

Some vehicles, such as minivans and the like, may employ sliding rear doors that are guided by tracks for translation in a generally fore/aft direction between open and closed positions. An exemplary sliding rear door is described in U.S. Pat. No. 6,036,257, issued Mar. 14, 2000 to Manuel, assigned to the assignee of the present application, and which is hereby incorporated by reference in its entirety.

SUMMARY OF THE INVENTION

A vehicle is provided that includes a vehicle body defining a passenger compartment and at least one body opening for providing selective access to the passenger compartment. The vehicle also includes a closure system for selectively obstructing and closing the at least one body opening. The closure system includes a first door and a second door.

The first door defines an outer surface and is pivotably connected with respect to the vehicle body for selective movement between open and closed positions. The second door defines an inner surface and is movably connected to the vehicle body. The closure system is configured for selective movement between a first configuration and a second configuration. In the first configuration, the first door is in the closed position such that the first door obstructs a first portion of the at least one body opening and the first door outer surface partially forms the exterior of the vehicle, and the second door is in a first position such that the second door obstructs a second portion of the at least one body opening and the second door inner surface cooperates with the vehicle body to further define the passenger compartment.

In the second configuration, the first door is in the closed position, and the second door is in a second position in which at least a portion of the inner surface opposes, or faces, the first door outer surface. The position of the first door in the second configuration enables access to the passenger compartment while minimizing the amount of lateral, i.e., transverse, extension of the first door. Thus, for example, the second door may be fully open to provide access through the second portion of the at least one body opening while remaining generally longitudinally oriented alongside the first door.

The closure system is preferably movable to a third configuration in which the first door is pivoted from the closed position to an open position, and in which the second door is pivoted from the second position to a third position, thus providing increased access to the passenger compartment by further unobstructing the at least one body opening.

The above features and advantages and other features and advantages of the present invention are readily apparent from the following detailed description of the best mode for carrying out the invention when taken in connection with the accompanying drawings.

DESCRIPTION OF THE PREFERRED EMBODIMENTS

Figure 1:
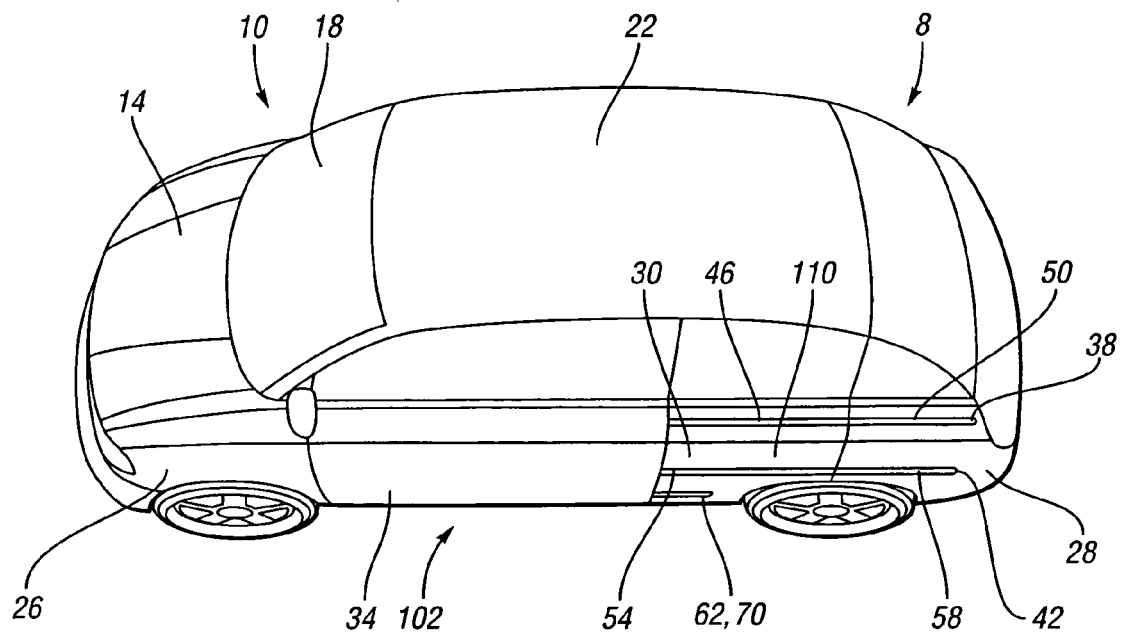
FIG. 1 is a schematic, perspective view of a vehicle body and a closure system including a front door and a rear door in a first configuration.

Referring to FIG. 1, a vehicle 8 includes a vehicle body 10 having a hood 14, windshield 18, roof 22, fender 26, and rear quarter panel 28. The vehicle body 10 also includes a rear door 30 and a front door 34. It should be noted that, in the embodiment depicted, the rear door 30 is the most rearward side door of the vehicle 8, and the front door 34 is the most forward side door of the vehicle 8. However, in the context of the present invention, a "front door" may be any door that is further forward than a "rear door," but may not necessarily be the most forward side door in a vehicle. Similarly, a "rear door" may be any door that is further rearward than a "front door," but may not necessarily by the most rearward door in a vehicle. Thus, for example, a "front door" or a "rear door" may be a middle side door.

The rear door 30 is pivotably connected to the quarter panel 28. The vehicle body 10 includes a first track 38 and a second track 42 spaced a vertical distance from the first track 38. The first track 38 includes two aligned segments. More specifically, the first track 38 is formed by track segment 46, which is rigidly connected to, or is integrally formed by, the rear door 30, and by track segment 50, which is rigidly connected to, or is integrally formed by, the rear quarter panel 28.

Similarly, the second track 42 is formed by track segment 54, which is rigidly connected to, or is integrally formed by, the rear door 30, and by track segment 58, which is rigidly connected to, or is integrally formed by, the rear quarter panel 28.

Figure 2:
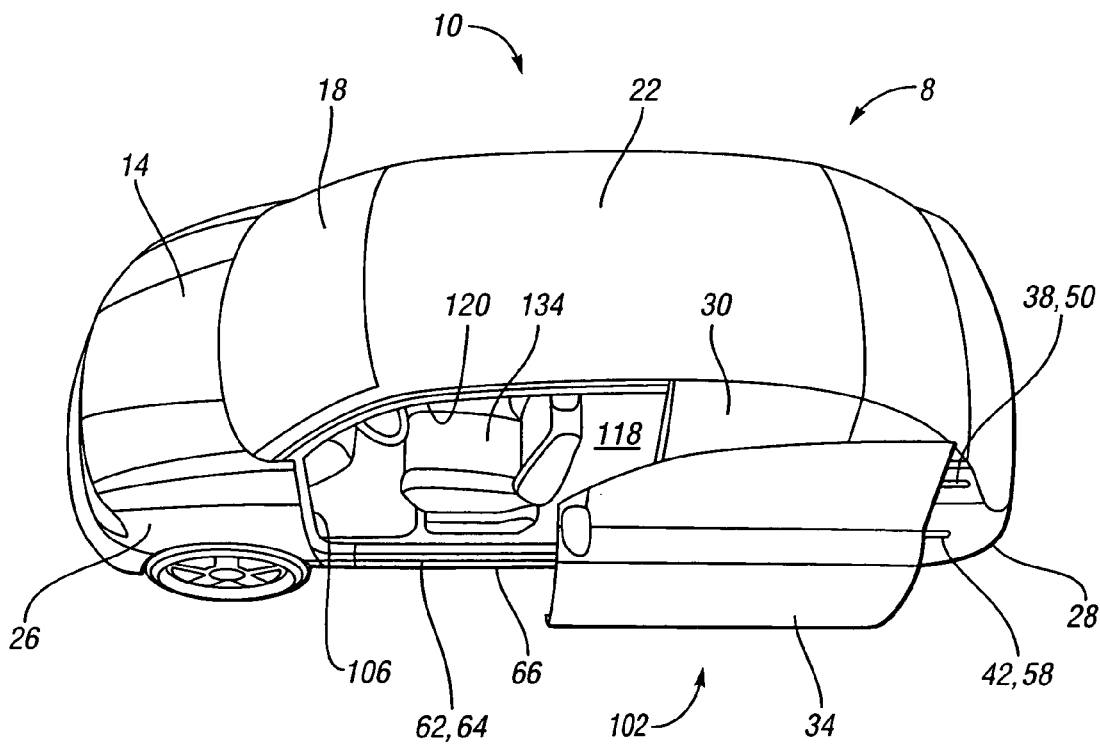
FIG. 2 is a schematic, perspective view of the vehicle body and closure system of FIG. 1 with the closure system in a progressive, intermediate configuration between the first configuration and a second configuration.

Referring to FIG. 2, wherein like reference numbers refer to like components from FIG. 1, a third track 62 includes track segment 64, which is rigidly connected to, or integrally formed by, a rocker panel 66. Referring again to FIG. 1, the track 62 also includes track segment 70, which is rigidly connected to, or integrally formed by, the rear door 30. It may be desirable to position the tracks where they have minimal aesthetic effect, such as along a window line, along a rub strip, etc.

Figure 3:
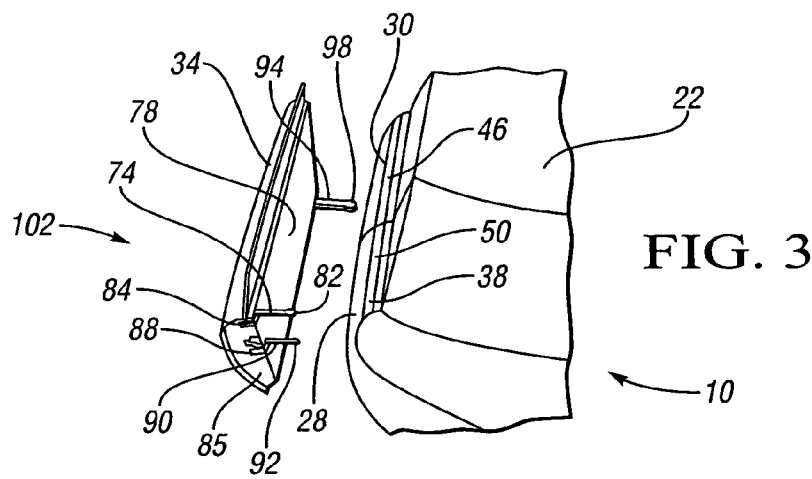
FIG. 3 is a schematic, partially exploded, perspective view of the front door and links operatively connecting the front door to the vehicle body and the rear door.

Referring to FIG. 3, wherein like reference numbers refer to like components from FIGS. 1 and 2, three links operatively interconnect the front door 34 to the rear door 30 and to the rest of the vehicle body 10. A first link 74 is pivotably connected to the front door 34 at one end, and has a roller element 82 at an opposite end. The front door 34 defines a slot 84 that is formed in the inner surface 78 and the rearward surface 85 of the front door 34. The first link 74 is pivotable between a first position and a second position. In the first position, the first link 74 extends through the slot 84 so as to protrude from the inner surface 78 such that the first link 74 is generally transversely oriented with respect to the vehicle body 10, as shown in FIG. 3. In the second position, the first link 74 extends through the slot 84 so as to protrude from the rearward surface 85 such that the first link is generally longitudinally oriented with respect to the vehicle body 10. The roller element 82 engages and is retained by the first track 38 such that the roller element 82 is limited to movement along the first track 38.

The door 34 also defines slot 88 that is formed in the inner surface 78 and the rearward surface 85. A second link 90 is pivotably connected to the front door 34 and is pivotable between first and second positions. In the first position, as shown in FIG. 3, the second link 90 extends through the slot 88 so as to protrude from inner surface 78 such that the second link 90 is generally transversely oriented with respect to the vehicle body 10. In the second position, the second link extends through the slot 88 so as to protrude from the rearward surface 85 and be generally longitudinally oriented with respect to the vehicle body 10. The second link 90 has a roller element 92 connected thereto. The roller element 92 engages and is retained by the second track (shown at 42 in FIG. 1) such that the roller element 92 is limited to movement along the second track. A third link 94 is rigidly connected to the front door 34 at inner surface 78. The third link 94 has a roller element 98 connected thereto. Roller element 98 engages and is retained by the third track (shown at 62 in FIGS. 1 and 2) such that the roller element 98 is limited to movement along the third track. Exemplary tracks and roller elements that may be employed with the vehicle body 10 are disclosed in U.S. Pat. No. 6,036,257, issued Mar. 14, 2000 to Manuel, and which is hereby incorporated by reference in its entirety.

Referring again to FIG. 1, the front and rear doors 34, 30 are part of a vehicle closure system 102. The closure system 102 is depicted in a first configuration in which the front and rear doors 34, 30 are in respective closed positions and cooperate to close a vehicle body opening (shown at 106 in FIG. 2). More specifically, the rear door 30 is in a closed position in which the rear door obstructs a rearward portion (shown at 107 in FIG. 5) of the body opening, and in which track segments 46, 54 are sufficiently aligned with track segments 50, 58, respectively, to enable movement of roller elements from track segments 46, 54 to track segments 50, 58, respectively. Similarly, track segment 70 is sufficiently aligned with track segment 64 (FIG. 2) to enable movement of roller elements from segment 64 to segment 70. Surface 110 of the rear door 30 forms a portion of the exterior surface of the vehicle body 10. Surface 114 (FIG. 4) is on the opposite side of the rear door 30 from surface 110 and forms a portion of the vehicle interior compartment (shown at 118 in FIG. 2).

Figure 5:
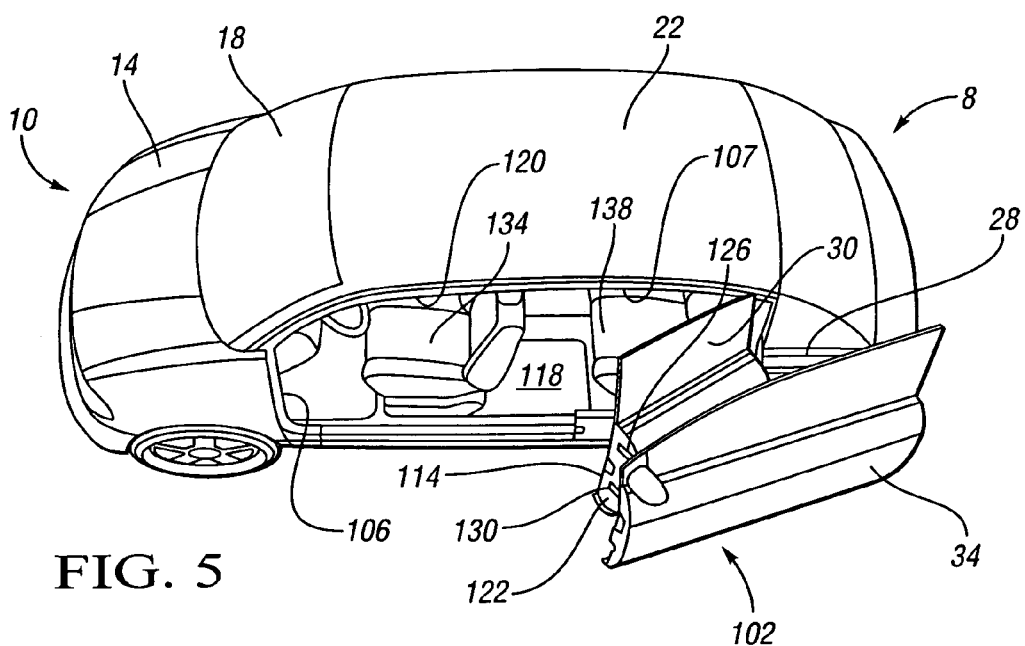
FIG. 5 is a schematic, perspective view of the vehicle body and closure system of FIG. 1 with the closure system in a third configuration.

The front door 34 is in a closed position in which the front door obstructs a forward portion (shown at 120 in FIG. 2) of the body opening. Roller element 98 (FIG. 3) is engaged with track segment 64 of track 62 (FIG. 2). Roller element 82 (FIG. 3) is engaged with track segment 46 of track 38. Roller element 92 (FIG. 3) is engaged with track segment 54 of track 42. As shown in FIG. 5, the rear door 30 includes a forward surface 122 with slots 126, 130 formed therein. The links 74, 90 (FIG. 3) are generally longitudinally oriented with respect to the vehicle body 10 and extend through a respective one of the slots 126, 130 to engage track segments 46, 54, respectively, when the front door 34 is in the closed position as shown in FIG. 1. The front door 34 is directly forward of the rear door 30 such that the rearward surface 85 (FIG. 3) of the front door 34 opposes, i.e., is in juxtaposition with, the forward surface 122 (FIG. 5) of the rear door 30. Front door inner surface 78 (FIG. 3) faces, and partially defines, the passenger compartment (shown at 118 in FIG. 2).

Referring to FIG. 2, the closure system 102 is shown in an intermediate configuration in which the rear door 30 is in its respective closed position, and the front door 34 is in a position in which the front door 34 is outboard and rearward of its closed position (shown in FIG. 1) such that a portion of the inner surface 78 (FIG. 3) of the front door 34 opposes, or is in juxtaposition with, at least a portion of the outer surface 110 (FIG. 1) of the rear door 30. The forward portions of tracks 62, 38, 42 curve inboard in order to enable the transverse and fore/aft movement of the door 34 from the position shown in FIG. 1 to the position shown in FIG. 2. The links 74, 90 (FIG. 3) extend transversely between the outer surface 110 (FIG. 1) of the rear door 30 and the inner surface 78 (FIG. 3) of the front door 34, and roller elements 82, 92 (FIG. 3) engage track segments 46, 54, respectively. Roller element 98 (FIG. 3) engages track segment 64. In moving rearward from the closed position of FIG. 1, the front door 34 provides access to the forward portion 120 of the body opening 106, which is sufficiently large to provide access to a front driver seat 134.

Figure 4:
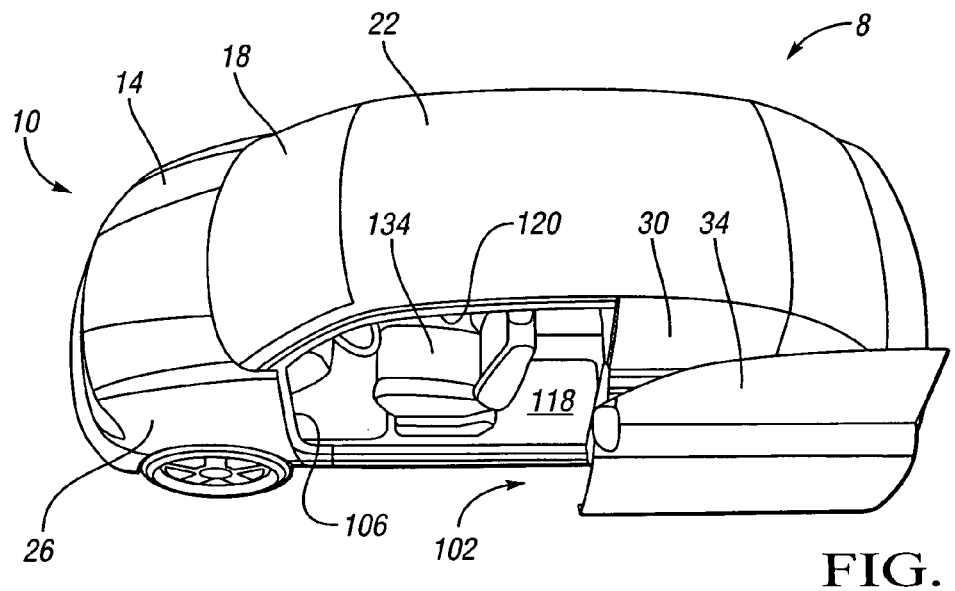
FIG. 4 is a schematic, perspective view of the vehicle body and closure system of FIG. 1 with the closure system in the second configuration.

Referring to FIG. 4, the closure system 102 is shown in a third configuration in which the rear door 30 is in its respective closed position, and the front door 34 is translated rearward from its position shown in FIG. 2 such that roller elements 82, 92 (FIG. 3) transfer from track segments 46, 54 to track segments 50, 58, respectively. The links 74, 90 (FIG. 3) extend transversely between the quarter panel and the inner surface 78 (FIG. 3) of the front door 34. Similarly, roller element 98 (FIG. 3) moves from track segment 64 on the rocker panel 66 to segment 70 on the rear door 30. The front door inner surface opposes the outer surface of the rear door and the exterior surface of the quarter panel, and the front door inner surface is generally parallel to the outer surface of the rear door.

Referring to FIG. 5, the closure system 102 is shown in a fourth configuration in which the rear door 30 is pivoted to an open position. The front door 34 is connected to the rear door 30 through linkage 94 (FIG. 3) and track segment 70 (FIG. 1), and thus, when the rear door is pivoted to its open position to expose the rearward portion 107 of the body opening 106, the front door 34 is pivoted about the roller elements 82, 92 (FIG. 3), which are engaged with track segments 50, 58 (FIG. 1) on the quarter panel. In the third configuration, the closure system 102 enables access for passengers to a rear seat 138, i.e., the rearward portion 107 of the body opening 106 is exposed.

The vehicle body 10 depicted has one body opening 106 on the side of the body shown. With the absence of a center pillar, as shown in the FIG. 5, the vehicle body 10 enables the front seat 134 to rotate 180 degrees for "conference seating" whereby an occupant of the front seat 134 faces an occupant of rear seat 138. However, the doors 30, 34 may cooperate to obstruct more than one body opening within the scope of the claimed invention. For example, a center pillar may be employed such that the rear door obstructs a rear door opening and the front door obstructs a front door opening.

Movement of the front and rear doors 30, 34 as described may be accomplished manually by a vehicle user, or, within the scope of the claimed invention, the vehicle 8 may include actuators, latches, hinges, sensors, etc., as required to move the closure system 102 between the first, second, and third configurations. Electronic power controls may be on board the vehicle body 10 with buttons, handles, and/or sensors. The closure system 102 could, within the scope of the claimed invention, also be controlled remotely via devices such as a key fob, personal digital assistant (PDA), Radio Frequency Identification (RFID) tag, etc. The closure system may be programmed to open differently for specific users, and may be reprogrammed to the changing needs of users.

Those skilled in the art will recognize a variety of vehicle body styles with which the closure system may be employed within the scope of the claimed invention. For example, and within the scope of the claimed invention, the closure system 102 may be used with vans, minivans, sedans, coupes, station wagons, convertibles, sport-utility vehicles, pickup trucks, etc.

While the best modes for carrying out the invention have been described in detail, those familiar with the art to which this invention relates will recognize various alternative designs and embodiments for practicing the invention within the scope of the appended claims.

What is claimed is:

1. A vehicle comprising:
   a vehicle body defining a passenger compartment and at least one body opening for providing selective access to the passenger compartment;
   a closure system including a first door and a second door;
   the first door defining a first door outer surface and being pivotably connected with respect to the vehicle body for selective movement between open and closed positions;
   the second door defining a second door inner surface and being movably connected to the vehicle body;
   the closure system being configured for selective movement between
      a first configuration wherein the first door is in the closed position such that the first door obstructs a first portion of said at least one body opening and the first door outer surface forms a portion of the exterior surface of the vehicle, and wherein the second door is in a first position such that the second door obstructs a second portion of said at least one body opening and the second door inner surface cooperates with the vehicle body to further define the passenger compartment, and
      a second configuration wherein the first door is in the closed position, and wherein the second door is in a second position such that at least a portion of the second door inner surface opposes the first door outer surface.

2. The vehicle of claim 1, wherein the second door in the second position is rearward and outboard of the first position.

3. The vehicle of claim 1, wherein the closure system is configured for selective movement to a third configuration in which the first door is pivoted from the closed position to the open position, and in which the second door is pivoted from the second position to a third position.

4. A vehicle comprising:
   a vehicle body defining a passenger compartment and at least one body opening for providing selective access to the passenger compartment;
   a closure system including a rear door and a front door;
   the rear door defining a rear door outer surface and a rear door forward surface, and being pivotably connected with respect to the vehicle body;
   the front door defining a front door inner surface and a front door rearward surface, the front door being movably connected with respect to the vehicle body;
   wherein the closure system is configured for selective movement between a first configuration in which the rear door is in a closed position such that the rear door obstructs a rearward portion of said at least one body opening, and the front door is in a first position such that the front door obstructs a forward portion of said at least one body opening, the front door inner surface cooperates with the vehicle body to further define the passenger compartment, and the front door rearward surface opposes the rear door forward surface, and
   a second configuration in which the rear door is in the closed position and the front door is in a second position rearward and outboard from the first position such that at least a portion of the front door inner surface opposes the rear door outer surface.

5. The vehicle of claim 4, wherein, when the closure system is in the second configuration, the front door is sufficiently connected to the rear door for movement together to a third closure system configuration in which the front and rear doors are pivoted from the second and closed positions, respectively.

6. The vehicle of claim 4, wherein the closure system is configured for selective movement to a third configuration in which the rear door is pivoted from the closed position to the open position and the front door is pivoted from the second position to a third position.

7. A vehicle comprising:
   a body defining a passenger compartment having at least one access opening to the passenger compartment;
   a closure system including
   a rear door being pivotably mounted with respect to the body,
   a first track having a first segment and a second segment, the first segment being rigidly connected with respect to the rear door for movement therewith, the second segment being rigidly connected with respect to the vehicle body rearward of the first segment;
   a second track having a third segment rigidly connected with respect to the rear door and a fourth segment being rigidly connected with respect to the vehicle body forward of the third segment;
   a front door; a first link being operatively connected to the front door and being operatively connected to the first track such that the first track guides movement of the first link; and a second link being operatively connected to the front door and being operatively connected to the second track such that the second track guides movement of the second link.

8. The vehicle of claim 7, wherein said closure system is selectively movable between a first configuration and a second configuration; the first configuration being characterized by the rear door being in a closed position in which the rear door closes a rearward portion of the access opening, the front door being in a first position in which the front door closes a forward portion of the access opening, the first link being operatively connected to the first segment, and the second link being operatively connected to the fourth segment; and the second configuration being characterized by the rear door being in the closed position, the first link being operatively connected to the second segment, and the second link being operatively connected to the third segment.

9. The vehicle of claim 8, wherein the front door in the second position is rearward and outboard of the first position.

10. The vehicle of claim 8, wherein said closure system is selectively movable to a third configuration in which the first link is operatively connected to the second segment, the second link is operatively connected to the third segment, and the rear door is pivoted from the closed position to an open position.

* * * * *